United States Patent Office 3,830,717
Patented Aug. 20, 1974

3,830,717
SEMICONDUCTOR CAMERA TUBE TARGET
Barry M. Singer, New York, N.Y. and Richard Bently Liebert, Ridgefield, Conn., assignors to North American Philips Corporation, New York, N.Y.
Filed Oct. 16, 1972, Ser. No. 297,715
Int. Cl. C23c 15/00; H01j 31/26; H01l 15/00
U.S. Cl. 204—192
11 Claims

ABSTRACT OF THE DISCLOSURE

Method of producing a semiconductor target for a camera tube, comprising sputtering a preliminary layer on a target wafer containing p-n junctions, sputtering being carried out in an atmosphere containing a nitrogen partial pressure; annealing the wafer-preliminary layer assembly; removing the preliminary layer; and providing an electron discharge layer on the target wafer.

A semiconductor camera tube target produced by this method.

BACKGROUND OF THE INVENTION

The present invention relates to a method of producing a semiconductor target for a camera tube and, particularly, of producing such a target with a resistive sea.

As is well known, a silicon vidicon target for a camera tube comprises a silicon wafer having a large number of separated diodes formed therein by silicon of different conductivities, i.e., p- and n-type conductivities, and between the diodes the silicon layer is covered by an oxide layer which can accumulate charge when the surface of the layer is scanned in a camera tube. In order to remove charge which normally accumulates on the oxide between the diodes, an electron discharge layer, or resistive sea, of suitable material is deposited with a sheet resistivity of $10^{12}$ to $10^{15}$ ohms per square.

The application (Ser. No. 167,633), now Pat. No. 3,723,278 discloses a resistive sea comprising a layer of hafnium and tantalum nitrides having a composition between the mononitride and the dinitride. The resistive sea is produced by depositing the layer on an oxidized silicon substrate, by radio-frequency (RF) reactive sputtering, in the diode mode, of hafnium mononitride and tantalum mononitride in an argon atmosphere containing nitrogen at a partial pressure of 5 to $10 \times 10^{-3}$ Torr. The semiconductor targets including the particular layer disclosed therein exhibit significant advantages, including low leakage current (i.e., low dark current) and radiation hardening.

BRIEF SUMMARY OF THE INVENTION

It has now been discovered that the above advantages derived from the invention of the above-mentioned application, as well as other advantages, viz, operability of the vidicon at potentials above the flat band voltage and reduction in image lag, can be simultaneously achieved by the present invention that, generally stated, comprises sputtering a preliminary layer on an oxidized silicon substrate; annealing the substrate preliminary layer assembly; removing the preliminary layer from the substrate; and depositing on the oxidized silicon substrate, a resistive sea, or evaporated electron discharge second layer, of another material, preferably cadmium telluride having a resistivity of about $1 \times 10^{14}$ ohms per square.

DESCRIPTION OF PREFERRED EMBODIMENT

Figure 1:
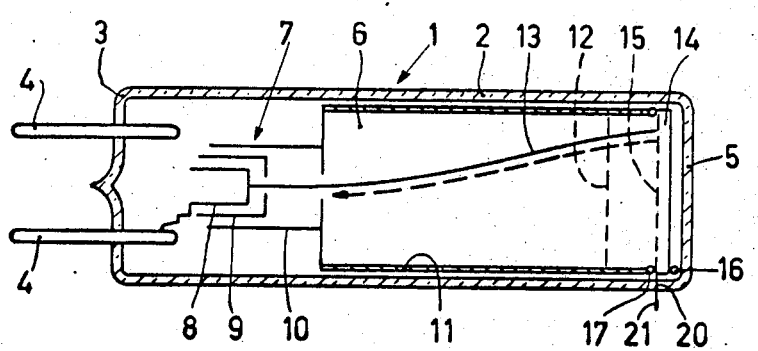
FIG. 1 is a camera tube employing a silicon target with a number of diodes.
Figure 2:
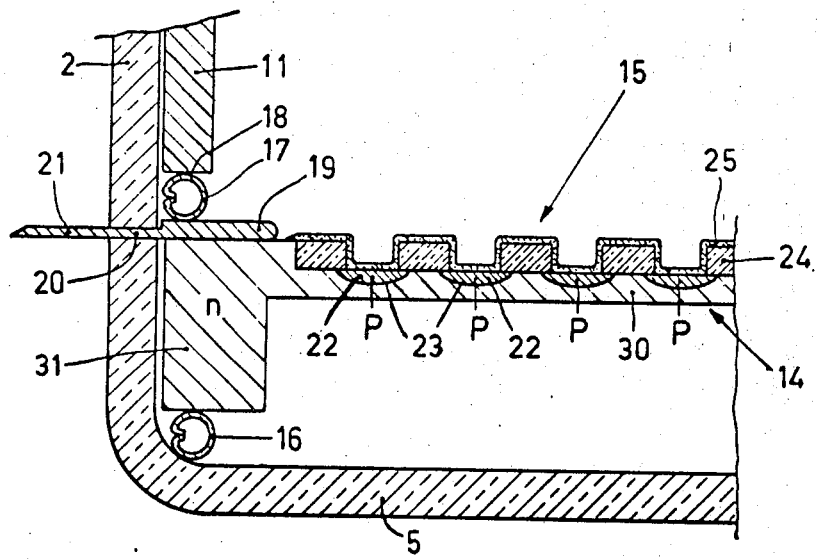
FIG. 2 is a sectional view of the target on an enlarged scale.

The camera tube of FIG. 1, which generally has the construction of known vidicon camera tubes, includes an elongated, cylindrical envelope 1 having a glass sheath 2 that encloses an exhausted space 6, an end face 3 having various through-connections 4 and a second end face 5 serving as an input window for the image information light. This space accommodates an electron gun 7, a cathode 8, a control-grid 9, and an anode 10. The tube comprises, furthermore, a cylindrical electrode 11 electrically connected to the anode 10 and supporting a mesh electrode 12 at the end remote from the cathode. The photo-sensitive target structure 14, which is produced in the manner detailed below, is scanned by the electron beam 13 produced by the electrode system, with the aid of conventional focusing and deflecting coils (not shown in the figure) surrounding the tube, which coils may be replaced by electrodes (not shown) inside the tube for electrostatic focusing and deflection. The target structure 14, described more fully hereinafter with reference to FIG. 2, is mounted in the envelope 1 by clamping its rim between a resilient mounting ring 16, which is in contact both with the input window 5 and the sheath 2, and a second resilient ring 17 which is in contact with the sheath and an end 18 of the electrode 11.

The target structure 14 (FIG. 2) comprises a semiconductive wafer of, e.g., silicon, the major portion of which is an n-type substrate having a plurality of isolated p-type regions 22 in a regular array 15 along the target surface thereof facing the electron gun 7. The wafer is recessed on the side facing the window 5 so that the central portion thereof forms a plate 30 of, for example, about 10 microns thickness. A metal ring 19, which serves for the electric connection, is clamped between the thicker annular circumferential part 31 of the wafer 14 and the ring 17 which consists of or is coated with an electrically insulating material, such as aluminum oxide. The ring 19 is connected to an electric conductor 20 passed through the wall 2. The isolated regions 22 may be circular or square and may have a diameter or a side of about 6 to 15 microns, the central distance between the regions being about 12 to 20 microns. Each one of the isolated regions forms a rectifying junction 23 at a small depth in the substrate, which junctions operate in the reverse direction when the tube is operating. When scanned by slow electrons the isolated regions 22 are, therefore, p-conducting and the substrate is n-conducting.

The side of the target structure 14 provided with the array 15 has an electrically insulating layer 24, which does not cover the portion of the thickened ring 31 in contact with the ring 19 and the entire surfaces of the p-type isolated regions 22. The insulating layer 24 has a thickness of about 0.5 to 1.0 microns and preferably consists of an oxide of the semiconductor material of the target structure, the oxide in the present case being silicon dioxide obtained by oxidizing the silicon plate 30. In practice this insulating layer is employed as a mask for establishing the p-conductive isolated regions 22. The silicon substrate covered by the perforated layer 24 is, for this end, exposed to a dopant, for example, boron, so that the parts of the substrate located at the apertures in the oxide layer become p-conducting to a depth of about 2 microns, the pn-junctions 23 with the substrate being thus formed.

An electron discharge layer 25 covers the insulating layer 24 and the isolated regions 22. This layer has a preferred electrical resistance of about $10^{12}$ to about $10^{15}$, more preferably about $1 \times 10^{14}$, ohms per square, and preferably consists essentially of cadmium telluride deposited to a preferred thickness of about 6000 Angstrom units or less; e.g., about 1200 or 1500 Angstrom units. Aside from cadmium telluride, the electron discharge layer may comprise, for example, antimony trisulfide, silicon monoxide, or bismuth trioxide.

In a preferred method of producing the target plate 14, a preliminary layer (not shown) of hafnium nitride and tantalum nitride is deposited by radio-frequency reactive sputtering in the diode mode from a source composed for example of 50 weight percent hafnium mononitride (HfN) and 50 weight percent tantalum mononitride (TaN). The sputtering atmosphere comprises argon containing undiluted high-purity dry nitrogen at a partial pressure of about $1 \times 10^{-3}$ to about $10 \times 10^{-3}$, preferably about $5 \times 10^{-3}$, Torr. Instead of argon, other inert gases can be used in the nitrogen-containing atmosphere employed for sputtering. The metal mononitrides are chosen to avoid the metallurgical difficulties of preparing a homogeneous metal target and to prevent nitrogen-metal reactions at the metal source surface during sputtering. Radio-frequency sputtering is desirable because the poor conductivity of the HfN/TaN sputtering source. The diode mode is chosen for convenience but RF triode or bias sputtering can be used. Reactive sputtering allows control of the nitrogen content of the deposited film. Other materials that can be sputtered to provide the preliminary layer include metals, such as copper or aluminum, and silicon, for example. Following deposition, the thus-produced wafer-preliminary layer is annealed at, for example, an elevated temperature, of about 350 to 500° C. for about 3 to 20 minutes or possibly longer, preferably for about 10 minutes in an argon atmosphere at about 400° C.

Figure 3:
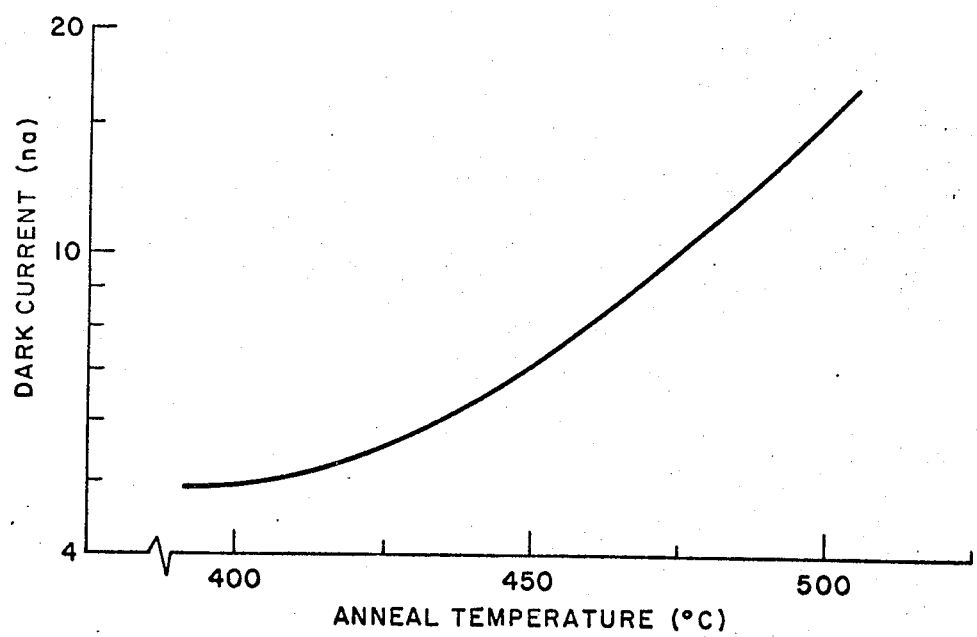
FIG. 3 is a graph showing the relationship between the dark current and the annealing temperature.

During the deposition of the hafnium nitride-tantalum nitride preliminary layer, the silicon vidicon target wafer is subjected to bombardment largely comprising negatively charged particles, such as energetic electrons and negative ions, neutral atoms, and short wave length electromagnetic radiation, e.g., X-ray and ultra-violet radiation and other such radiation have wave lengths preferably not exceeding that of the ultra-violet range. The result is radiation damage, e.g., an increase in the number of fast surface states at the silicon-silicon dioxide interface and an increase in the leakage currents (tube dark current) of the diodes. Low leakage currents in the finished target can be obtained by the above-mentioned post-deposition anneals since it has been found that the same lower dark current (as well as radiation hardening) is maintained when the hafnium nitride-tantalum nitride preliminary layer is removed, as by etching, for example, and then a final electron discharge layer (e.g., 25 in FIG. 2) of, for example, cadmium telluride, is deposited on the uncovered surface of the semiconductor wafer, this lower leakage current and radiation hardening being in addition to other advantages described below. The annealing operation is believed to anneal out these fast surface states. FIG. 3, which shows the effect of annealing temperature on dark current when an argon ambient is used and for an annealing time of ten minutes, indicates satisfactory levels of dark current to be achievable over the annealing temperature range of about 400 to 500° C.

The sputtered hafnium nitride-tantalum nitride preliminary layer is then removed from the wafer, as by etching, for example, in a suitable reagent (e.g., phosphoric acid heated to 180° C.), the reagent being selected and the removal process being carried out so as not to affect adversely the wafer. Then, a conductive sea, or electron discharge layer (e.g., 25 in FIG. 2) is provided on the uncovered surface of the wafer, i.e., over the insulating layer (24 in FIG. 2), by evaporating a suitable material thereon. A preferred material for the resistive sea is cadmium telluride, although there can be used other materials of suitable resistivity that are compatible with the wafer. Evaporation of cadmium telluride is carried out by, for example, heating technical grade cadmium telluride crystals in a tantalum boat, at a temperature of about 700° C. to about 800° C., using an atmosphere of $1 \times 10^{-4}$ Torr oxygen, the wafer being at substantially room temperature. Also, deposition methods other than evaporation, e.g., plating, may be used to produce the electron discharge layer.

A finished target produced in the above manner and including a resistive sea of evaporated cadmium telluride exhibits, in addition to low leakage current and resistance to radiation damage, the further advantage of increased signal-handling capacity. With cadmium telluride layers having certain desired thicknesses and with certain values of spacing between the isolated regions (e.g., 22 in FIG. 2) thereof, there can be achieved optimized modulation transfer function from the beam and resistive sea conjunctively. Such optimized modulation transfer function can be achieved with, for example, a 1500 Angstrom thick cadmium telluride electron discharge layer having a 19 micron hexagonal-close-packed spacing between isolated regions and with a 1200 Angstrom thick such layer with a 15 micron hexagonal-close-packed spacing. Where the sheet resistivity of the cadmium telluride resistive sea is about $1 \times 10^{14}$ ohms per square, the target can be operated at a targe voltage that exceeds the flat band voltage by up to about 5 to 7 volts, without suffering from the undesirable phenomenon often referred to as MOS blooming, which is surface inversion arising from high light levels or defects in the semiconductor and leading to short circuiting of various p-type isolated regions and the consequent spreading, or blooming, of the image.

As a result of this ability to exceed the flat band voltage with target structures produced according to the present invention, there is achieved image lags of less than 10% in the first field and zero in the third field and, furthermore, there is minimized or even eliminated the undesirable swirls that arise from bulk resistivity variations.

Target structures made according to the present invention and comprising an n-type conductivity semiconductor substrate having p-type conductivity regions therein and an interrupted silicon oxide insulating layer thereon, with an evaporated cadmium telluride electron discharge layer thereover, were aged for 250 hours at an accelerated rate of 25 hours per hour to simulate a normal aging time of about 6000 hours. Such accelerated aging was conducted using a 13 microampere beam current, 450 volt focus electrode potential, and underscanning with an underscan-to-normal ratio of 10 to 1. The thus-aged target structures exhibited only an insignificant increase in dark current from the initial dark current values thereof when the camera tube mesh potential ranged as high as 600 volts; e.g., with a 600 volt mesh potential, the initial dark current was 12 nanoamperes at 8 volts target potential and 33° C. and the final dark current after about 250 hours was 16 nanoamperes at 8 volts and 34° C. In contrast thereto, target structures produced by merely evaporating a cadmium telluride electron on a comparable substrate with similar p-type regions and insulating layer, exhibited a 50 nanoampere increase in leakage current (i.e., dark current) after only 80 hours of accelerated aging under the same conditions, with a comparable mesh potential.

We claim:
1. A method of producing a camera tube target, comprising the steps of:
    (a) providing a target wafer of a semiconductive substrate of a first conductivity type provided with an array of isolated regions of a second conductivity type, each of said isolated regions forming a rectifying junction with said substrate;
    (b) subjecting said target wafer to impingement by at least one of energetic corpuscular and short wave length electromagnetic radiation, so as to produce radiation damage therein;
    (c) annealing said target wafer so as to remove substantially said radiation damage; and thereafter
    (d) depositing an electron discharge layer on said target.

2. A method of producing a camera tube target, comprising the steps of:
  (a) providing a target wafer of a semiconductive substrate of a first conductivity type provided with an array of isolated regions of a second conductivity type, each of said isolated regions forming a rectifying junction with said substrate;
  (b) sputtering a preliminary layer on said target wafer, so that said target wafer is impinged by at least one of negatively charged particles, neutral particles, and electromagnetic radiation having a wave length in the ultra-violet range or shorter, whereby fast surface states are created in said target wafer;
  (c) annealing said target wafer and preliminary layer at an elevated temperature, thereby substantially annealing out said fast surface states;
  (d) removing said preliminary layer from said target wafer; and then
  (e) depositing an electron discharge layer on said target wafer.

3. A method of producing a camera tube target, comprising the steps of:
  (a) providing a target wafer of a semiconductive substrate of a first conductivity type provided with an array of isolated regions of a second conductivity type, each of said isolated regions forming a rectifying junction with said substrate;
  (b) depositing on said target wafer a preliminary layer of tantalum and hafnium nitrides having a composition between the mononitride and the dinitride, said preliminary layer being deposited by RF reactive sputtering of tantalum and hafnium mononitrides in an inert gas atmosphere containing nitrogen at a partial pressure of about $1\times10^{-3}$ Torr to about $10\times10^{-3}$ Torr;
  (c) annealing said target wafer with said preliminary layer at an elevated temperature, thereby annealing out the fast surface states therein;
  (d) removing said preliminary layer; and then
  (e) depositing an electron discharge layer on said target wafer.

4. A method as defined in Claim 3, wherein said elevated annealing temperature is in the range of about 350° C. to about 500° C.

5. A method as defined in Claim 3, wherein said preliminary layer is removed by etching.

6. A method as defined in Claim 3, wherein said electron discharge layer is produced by evaporation.

7. A method as defined in Claim 3, wherein said electron discharge layer comprises a material selected from the group consisting essentially of cadmium telluride, antimony trisulfide, silicon monoxide, and bismuth trioxide.

8. A method as defined in Claim 3, wherein said discharge layer consists essentially of cadmium telluride and has a thickness of about 1500 and about 1200 Angstrom units where the hexagonal-close-packed spacing is 19 and 15 microns, respectively.

9. A method as defined in Claim 3, wherein said discharge layer consists essentially of cadmium telluride and has a sheet resistivity of about $1\times10^{14}$ ohms per square.

10. A method as defined in Claim 3, wherein said electron discharge layer is characterized by a sheet resistivity of about $10^{12}$ to about $10^{15}$ ohms per square.

11. A semiconductor vidicon target produced according to the method defined in Claim 2.

References Cited

UNITED STATES PATENTS

| | | |
|---|---|---|
| 3,564,309 | 2/1971 | Hoeberechts _____ 313—66 |
| 3,633,077 | 1/1972 | Tsuji _____ 317—235 R |
| 3,707,657 | 12/1972 | Veith _____ 317—235 NA |
| 3,723,278 | 3/1973 | Liebert et al. _____ 204—192 |

THOMAS M. TUFARIELLO, Primary Examiner

U.S. Cl. X.R.

313—66; 317—235 NA